United States Patent [19]
Pasfield

[11] Patent Number: 5,680,194
[45] Date of Patent: Oct. 21, 1997

[54] PERISCOPIC TELEMICROSCOPE FOR SPECTACLES

[76] Inventor: Michael T. Pasfield, 17230 Dolores, Livonia, Mich. 48152

[21] Appl. No.: 309,196

[22] Filed: Sep. 20, 1994

[51] Int. Cl.$^6$ ................................................ G02C 1/00
[52] U.S. Cl. ........................................ 351/158; 351/41
[58] Field of Search ............................ 351/158, 41, 47, 351/57; 359/482, 481, 480, 402, 403, 404, 405, 406, 399, 400, 407, 471, 474, 506

[56] References Cited

U.S. PATENT DOCUMENTS

| | | |
|---|---|---|
| 1,395,625 | 11/1921 | Zimmerman . |
| 2,217,475 | 9/1940 | Goehring, Sr. . |
| 2,226,941 | 12/1940 | Montalvo-Guenard . |
| 2,389,428 | 5/1945 | Glasser . |
| 3,273,456 | 9/1966 | Feinbloom . |
| 3,522,983 | 8/1970 | Daniels . |
| 4,195,918 | 4/1980 | Freche et a. . |
| 4,196,966 | 4/1980 | Malis ............................... 359/482 |
| 4,364,645 | 12/1982 | Feinbloom . |
| 4,540,238 | 9/1985 | Edwards . |
| 4,704,000 | 11/1987 | Pekar et al. . |
| 4,795,235 | 1/1989 | Spitzberg . |
| 4,863,468 | 9/1989 | Feinbloom et al. . |
| 4,877,316 | 10/1989 | Edwards et al. . |
| 5,028,127 | 7/1991 | Spitzberg . |
| 5,076,682 | 12/1991 | Pasfield . |

*Primary Examiner*—Hung X. Dang
*Attorney, Agent, or Firm*—Reising, Ethington, Barnard & Perry, PLLC

[57] ABSTRACT

A periscopic telemicroscope for spectacles mounts over the periphery of one of the spectacle lenses and extends behind and towards the central axis of the spectacle lens to provide a high level of magnification while maintaining a cosmetically acceptable appearance. The telemicroscope has upper and lower housings with the upper housing holding an objective lens and a mirror and the lower housing holding a divergent lens and a prism. The mirror is oriented to reflect light received from the objective lens downward towards the divergent lens. The prism is oriented to reflect the light received from the divergent lens so that it exits the telemicroscope towards the wearer's eye and can be viewed by upwards rotation of the eye. Focusing is provided by a lever that is pivotally mounted on the upper housing and that cooperatively engages a guide pin which extends from the lower housing through a cam slot in the lever to move the lower housing toward and away from the central axis of the spectacle lens. The telemicroscope is mounted over a potation of the spectacle lens using a releasable clamp that obviates the need for custom alteration of the spectacle lens or frame when attaching the telemicroscope. The clamp utilizes a clamping member which presses the spectacle lens against upper housing. A set screw is used to tighten or release the clamping member so as to permit adjustments of the telemicroscope as are necessary for a proper fitting of the telemicroscope to the patient's spectacles.

17 Claims, 4 Drawing Sheets

PERISCOPIC TELEMICROSCOPE FOR SPECTACLES

TECHNICAL FIELD

The invention relates generally to low vision corrective telescopes for use with spectacles and, more particularly, to focusable bioptic telescopes, commonly referred to as telemicroscopes.

BACKGROUND OF THE INVENTION

The field of low vision is directed to individuals whose visual acuity cannot be corrected by conventional single lens systems (e.g., spectacles) to better than approximately 20/100. Such individuals are referred to as low vision patients. For these individuals, the correction provided by a single lens system is insufficient to permit them to legally engage in driving or to engage in many other common activities. Consequently, these individuals typically wear a corrective lens system which includes spectacles for a general improvement in visual acuity and a small telescope mounted to the spectacles for one or both eyes to provide a magnified image that has a small field of view, but at a clarity of approximately 20/20. The telescopes used in these corrective lens systems are known as bioptic telescopes. To further increase the clarity of images seen through bioptic telescopes, they are sometimes constructed so as to be focusable, in which case they are generally referred to as telemicroscopes.

Bioptic telescopes are generally of two types: axial, in which the telescope has a single optical axis; and periscopic, in which mirrors and/or prisms are used to provide a folded light path that enables observation along an optical axis that is displaced from a direct line of sight. Axial bioptic telescopes can be attached to the frame of the spectacles, as in U.S. Pat. No. 2,226,941 issued Dec. 31, 1940 to J. L. Montalvo-Guenard and U.S. Pat. No. 5,076,682 issued Dec. 31, 1991 to M. T. Pasfield. However, a permanent attachment directly to the spectacle lenses is more common, either on a surface of the lens, as indicated in U.S. Pat. No. 3,522,983 issued Aug. 4, 1970 to E. Daniels and U.S. Pat. No. 4,195,918 issued Apr. 1, 1980 to Freche et al., or within a hole bored into the lens, as indicated in U.S. Pat. No. 2,389,428 issued Nov. 20, 1945 to C. J. Glasser, U.S. Pat. No. 3,273,456 issued Sep. 20, 1966 to W. Feinbloom, U.S. Pat. No. 4,364,645 issued Dec. 21, 1982 to W. Feinbloom, and U.S. Pat. No. 4,863,468 issued Sep. 5, 1989 to R. E. Feinbloom et al. Some axial bioptic telescopes extend from the carrier lens outwardly, away from the wearer's eye, as indicated in the above-noted patents, or inwardly towards the eye, as indicated U.S. Pat. No. 4,450,238, issued Sep. 10, 1985 to D. B. Edwards, U.S. Pat. No. 4,877,316 issued Oct. 31, 1989 to D. B. Edwards et al., and U.S. Pat. No. 5,076,682, noted above. In either case, axial bioptic telescopes extend along an optical path that, when carried on the spectacles, intersects the wearer's eye.

Periscopic arrangements have also been used in telemicroscopes and other bioptic telescopes, as exemplified by U.S. Pat. No. 4,704,000 issued Nov. 3, 1987 to J. Pekar et al., U.S. Pat. No. 4,795,235 issued Jan. 3, 1989 to L. A. Spitzberg, and U.S. Pat. No. 5,028,127 issued Jul. 2, 1991 to L. A. Spitzberg. In U.S. Pat. No. 4,704,000, a telemicroscope is provided by way of a casing that mounts over the top of the frame of the spectacles and that extends lengthwise in the direction of the wearer's eyebrows. The objective lens is mounted within the casing so that the majority of the focal length of the telemicroscope is along an optical axis that extends lengthwise through the casing. Focusing of the telemicroscope is accomplished by moving the objective lens along that optical axis. U.S. Pat. Nos. 4,795,235 and 5,028,127 disclose telemicroscopes which are permanently attached to and extend rearwardly from one of the eyeglasses' lenses. Focusing is achieved by adjusting the position of an eyepiece lens along the eyepiece optical axis (i.e., towards the wearer's eye). However, the available room behind the spectacle lens for focussing these telemicroscopes in the direction of the eye is limited by the proximity of the eye to the spectacle lens.

One disadvantage common to many bioptic telescope systems is that they require a trade off between maximizing the telescope's field of view and magnification on the one hand, and minimizing the weight and impact on cosmetic appearance of the spectacles on the other hand. In particular, the smaller telescopes that are mounted behind the lens, while aesthetically pleasing, are limited in their field of view and magnification capabilities, whereas the larger devices mounted entirely in front of or over the spectacle lenses, while providing good magnification and field of view, are relatively burdensome in terms of weight and frontal protrusion, rendering them uncomfortable and cosmetically undesirable.

As exemplified by the above-noted patents, state of the art bioptic telescope systems are directed to providing acceptable cosmetic appearance, minimal frontal protrusion, and minimal weight, with little attention being directed toward simplifying the task of properly fitting and mounting the telescope on the patient's spectacles. Bioptic telescope systems continue to be designed to be permanently attached to the patient's spectacles once the proper location relative to the spectacle lens is determined. As is known to practitioners and low vision patients alike, the overall process for fitting and manufacturing such bioptic telescopes is time consuming and expensive. Initially, the proper location of the telescope relative to the patient's central viewing axis must be determined. Thereafter, the spectacles are typically sent to the manufacturer of the telescope for mounting to the spectacles, after which the spectacles are returned to the practitioner. It is not uncommon for this process to take three to four weeks, during which time the patient is without the eyeglasses. Often, even though the patient's current eyeglass prescription is used for the eyeglass lens, the patient cannot wait several weeks for the return of the eyeglasses and is therefore forced to purchase a new pair of spectacles.

Moreover, once the telescope is mounted, its location is fixed and cannot thereafter be adjusted laterally relative to the lens. This aspect of conventional bioptic telescope systems is disadvantageous because accurate positioning of the telescope is crucial for maximum acuity, especially when two telescopes are placed on the eyeglasses. Even slight errors in the initial fitting or the mounting of the telescope to the eyeglasses can make them unsuitable for the patient, in which case they must be returned to the telescope manufacturer, necessitating further delay. The above-noted U.S. Pat. No. 5,076,682 seeks to alleviate this problem by providing a telemicroscope that is supported from the frame of the spectacles. Although greatly simplifying the ability of the practitioner to adjust the position of the telescope with respect to the eyeglass lens, that construction still requires either custom frames or a modification of conventional eyeglass frames to support the telescope.

Furthermore, the patient is typically not presented the opportunity to wear the telescope on a trial basis. Rather, the patient's only contact with the telescope prior to receiving it permanently mounted on the spectacles is in the practitioner's examination room, using a rather cumbersome, multiply-adjustable trial frame that is primarily handled by the practitioner.

As illustrated by U.S. Pat. No. 1,395,625, issued Nov. 1, 1921 to L. J. Zimmerman, it is known to attach a magnifying lens to a pair of spectacles using a pair of clamping members that are biased towards each other under the force of a spring. A similar construction is shown in U.S. Pat. No. 2,217,475, issued Oct. 8, 1940 to F. E. Goehring, Sr. Such an arrangement permits the location of the magnifying lens on the carrier lens to be readily altered by the wearer, whether intentionally or accidentally. Consequently, that arrangement is not entirely satisfactory for the mounting of telemicroscopes, since the relative location of the telemicroscope must be fixed under the direction of the practitioner and should thereafter be maintained. Accordingly, clamping arrangements such as those disclosed in the above-noted U.S. Pat. Nos. 1,395,625 and 2,217,475 are currently disfavored by practitioners of low vision.

SUMMARY OF THE INVENTION

The present invention seeks to overcome certain disadvantages of prior art bioptic telescope systems to provide a telemicroscope that has a good field of view at a good level of magnification, that is easily focusable over a wide range of distances, that substantially reduces the burden of fitting and mounting for both the practitioner and patient, and that minimizes the impact of the telemicroscope on the cosmetic appearance of the spectacles to which it is attached.

In accordance with one aspect of the invention, there is provided a periscopic telemicroscope which includes a housing having a first opening and a second opening, a plurality of optically reflective elements that are mounted within the housing and that define an optical path extending from the first opening to the second opening, a convergent lens mounted within the housing and being disposed in the optical path, and a divergent lens mounted in the housing and being disposed in the optical path, with the divergent lens being movable along the optical path relative to the convergent lens to thereby vary the focal length of the periscopic telemicroscope. The housing is adapted to attach over a portion of the periphery of a lens of a pair of eyeglasses such that the first opening is located outside the periphery of the lens of the pair of eyeglasses, whereby light entering the first opening does not pass through the lens of the pair of eyeglasses.

The housing can comprise an upper housing and a lower housing that is movable with respect to the upper housing along a portion of the optical path that extends from the upper housing to the lower housing. The upper housing contains the first opening, the convergent lens, and a first one of the optically reflective elements, and the lower housing contains the second opening, the divergent lens, and a second one of the optically reflective elements. Focusing of the telemicroscope is accomplished simply by moving the lower housing further into and out of the upper housing.

Relative movement of the upper and lower housings can be provided by a focusing mechanism that comprises a guide pin connected to the lower housing and extending outwardly from the lower housing and a lever having a base pivotally mounted to the upper housing and having a lever arm extending away from the base. The upper housing has a vertically extending guide slot, with the guide pin extending from the inner housing through the guide slot and into a cam slot formed in the base of the lever. Pivoting of the lever causes the surface of the cam slot to bear against the guide pin, resulting in movement of the guide pin and, thus, the lower housing. The vertical guide slot restricts the guide pin and lower housing to vertical movement into and out of the upper housing.

Focusing of the telemicroscope by vertical movement of the lower housing with respect to the upper housing permits the focusing mechanism to be located behind the lens to minimize its cosmetic impact, yet does not require focusing of the telemicroscope towards the eye. Rather, focusing is generally parallel to the plane of the spectacle lens, which permits telemicroscope to be maintained a safer distance from the eye and allows for focusing over a wide range of distances at a relatively large level of magnification.

In accordance with another aspect of the invention, there is provided a periscopic bioptic telescope for attachment over a portion of the periphery of a lens of a pair of eyeglasses to provide increased visual acuity along an optical axis located beyond the periphery of the lens of the eyeglasses. The bioptic telescope comprises a housing having a first opening located along a first optical axis and a second opening located along a second optical axis that is different than the first optical axis, a plurality of optically reflective elements that are mounted within the housing and that define an optical path extending from the first opening to the second opening, a convergent lens mounted within the housing and being disposed in the optical path, a divergent lens mounted in the housing and being disposed in the optical path, and a clamp that is attached to the housing and that is offset from the first opening such that, when the housing is attached over a portion of the periphery of a lens of a pair of eyeglasses by the clamp, the first opening is located beyond the periphery of the lens and the second opening is located behind the lens.

The clamp can comprise a clamping member that is located opposite a vertically extending portion of the upper housing, with the clamping member having a head portion that can be moved horizontally along a passage in the upper housing to move the clamping member toward and away from the vertically extending portion of the upper housing. A set screw threaded into the passage is used to provide the force needed to securely hold the spectacle lens between the clamping member and the upper housing.

This clamping arrangement permits the telemicroscope to be securely attached to the spectacles without custom alteration of the spectacle frame or lens. The telemicroscope can therefore be attached to a patient's existing frames at the practitioner's office during an examination without the spectacles having to be sent out of the office or having to be left at the office for mounting of the telemicroscope.

Other advantages of the invention should become apparent upon reading the following detailed description of a preferred embodiment of the invention.

BRIEF DESCRIPTION OF THE DRAWINGS

A preferred exemplary embodiment of the present invention will hereinafter be described in conjunction with the appended drawings, wherein like designations denote like elements, and:

FIG. 1A is a perspective view of a clamping arm used with the telemicroscope of FIG. 1;

DESCRIPTION OF THE PREFERRED EMBODIMENT

Figure 1:
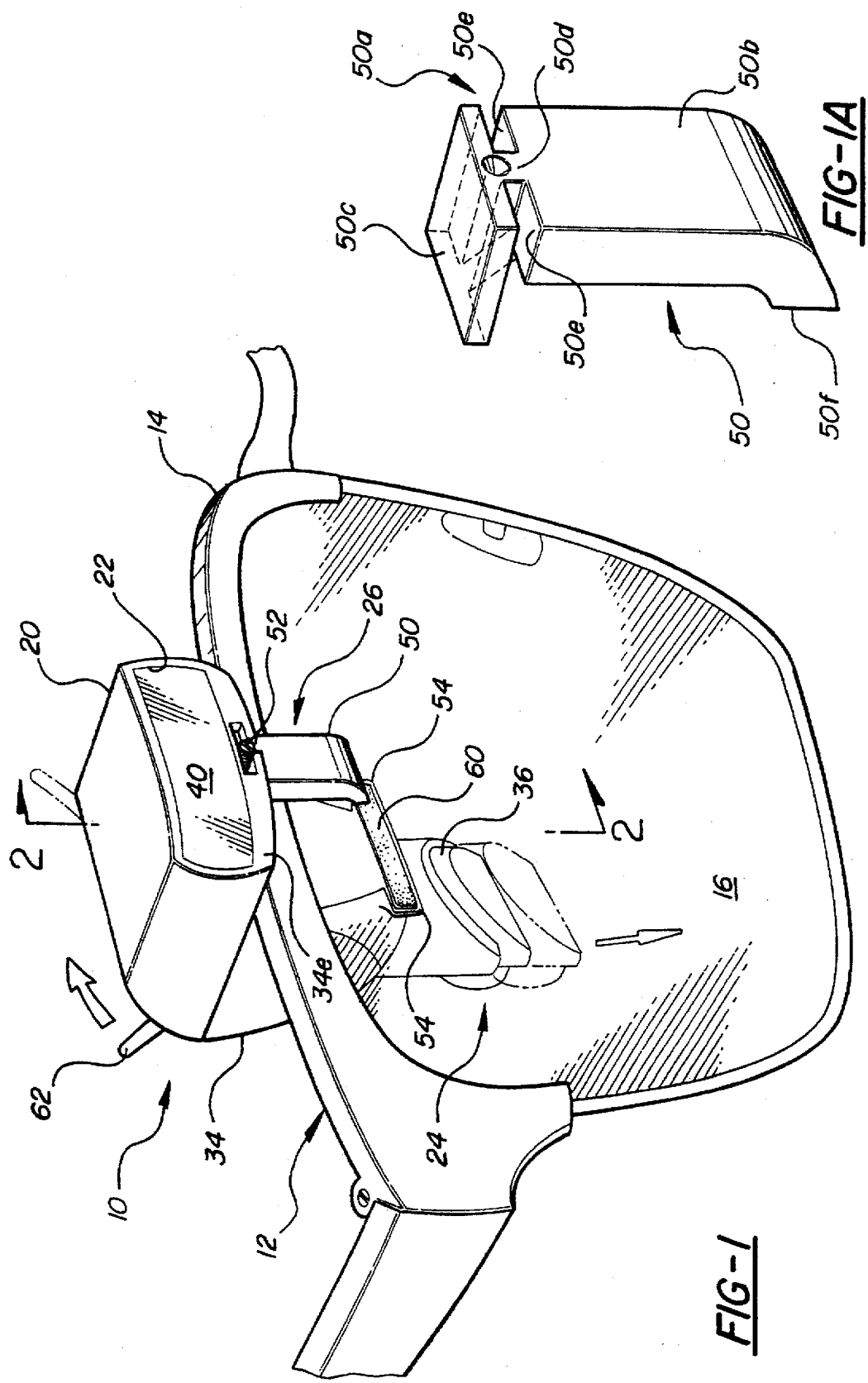
FIG. 1 is a front perspective view showing a preferred embodiment of the periscopic telemicroscope of the present invention mounted on the right lens of a pair of spectacles.
Figure 2:
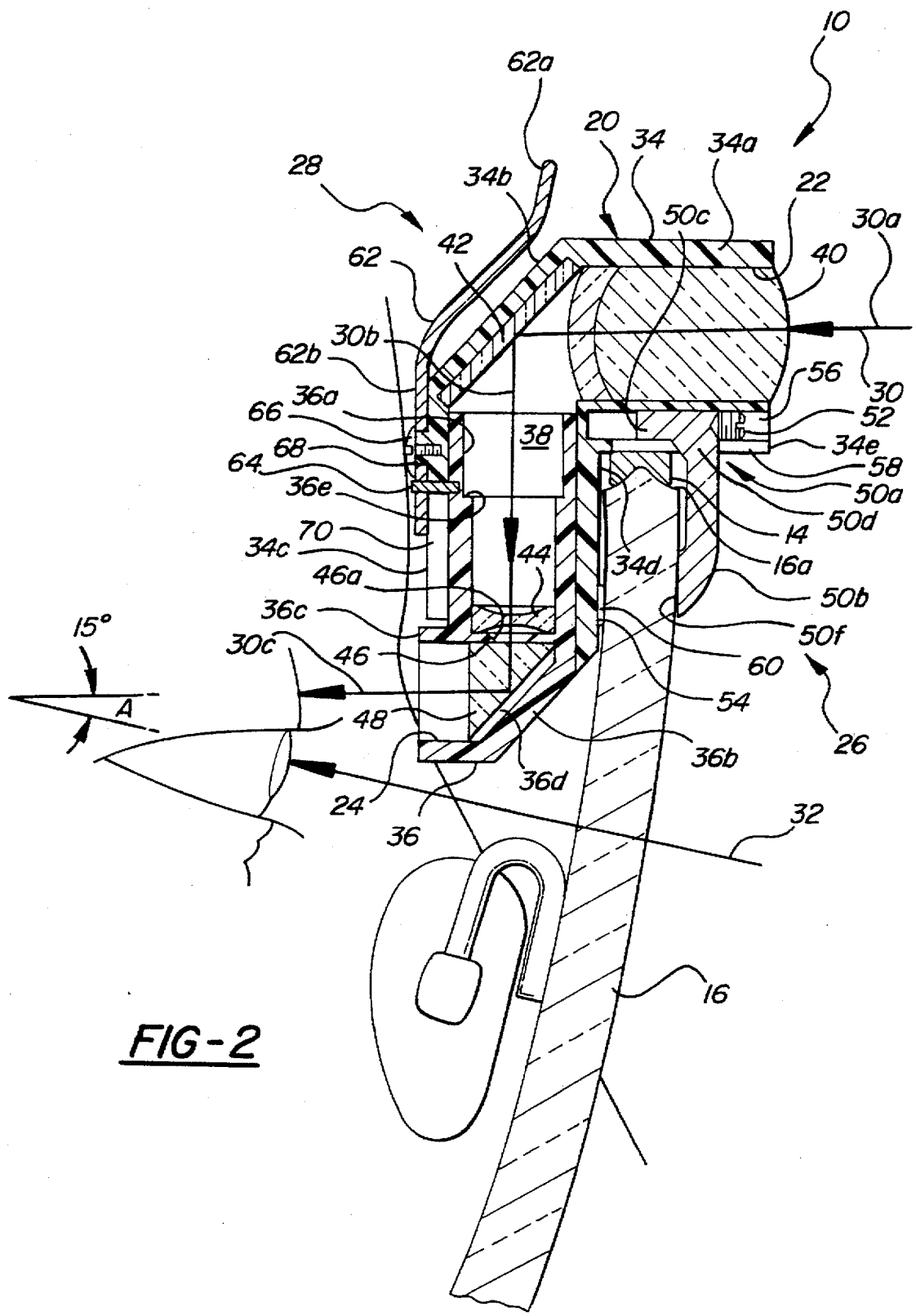
FIG. 2 is a sectional view taken along the 2—2 line of FIG. 1 showing the orientation of the telemicroscope of FIG. 1 relative to the normal viewing axis of the wearer.

Referring to FIGS. 1 and 2, there is shown an embodiment of a periscopic telemicroscope of the present invention, designated generally as 10, mounted to a pair of spectacles 12 having a frame 14, a right lens 16, and a left lens (not shown). Although only a single telemicroscope is shown, it will be appreciated that a second telemicroscope could be provided on the left lens for binocular viewing. Telemicroscope 10 comprises a housing 20, a light entrance opening 22, a light exit opening 24, a clamp 26, a focusing mechanism 28, and an optical system that provides an optical path 30 extending between entrance opening 22 and exit opening 24.

In accordance with the invention, telemicroscope 10 has several advantageous design features. First, it provides a periscopic view along a line of sight located beyond the periphery 16a of lens 16. This is accomplished by designing housing 20 to be adapted to attach over a portion of the periphery 16a of lens 16 such that entrance opening 22 is located outside the lens periphery 16a with exit opening 24 being located behind lens 16. This construction enables much of the telemicroscope to be located behind the lens, while receiving light from along an optical axis that does not pass through the lens, thus avoiding problematic diffraction of the light which can occur if it first passes through the spectacle lens. Second, clamp 26 has a construction that permits telemicroscope 10 to be mounted to standard spectacles without requiring any alteration the spectacle lenses or frame. Also, the construction of clamp 26 enables simple adjustment of the location of telemicroscope 10 on the spectacles, but prevents inadvertent changes in its location due to the rigours of normal use. Third, the focal length of telemicroscope 10 is adjustable in a vertical direction behind the lens, both towards and away from the central axis 32 of lens 16 rather than towards the eye, with central axis 32 being understood to be the axis extending through the geometric center of lens 16 that is normal to the surface of lens 16. As indicated in FIG. 2, central axis 32 may also comprise the normal viewing axis of the wearer. These aspects of telemicroscope 10 will be explained in greater detail below.

Figure 4:
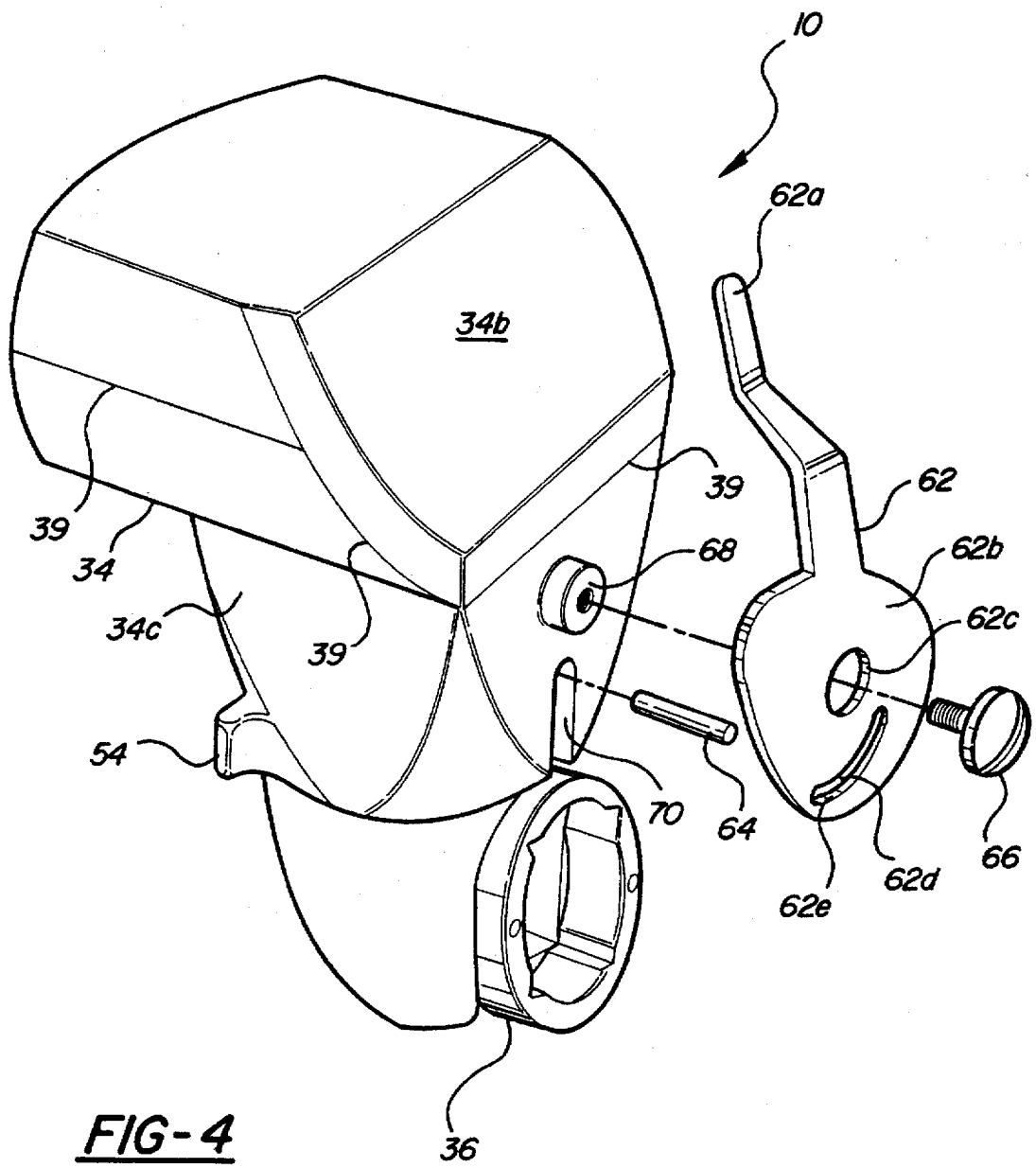
FIG. 4 is a rear perspective view of the telemicroscope of FIG. 1 showing an exploded view of the focusing mechanism.

Housing 20 comprises an upper housing 34 and a lower housing 36. Upper housing 34 has an upper wall 34a which circumscribes and defines a first portion of a passage 38 that extends horizontally and that has a cross-sectional shape corresponding to entrance opening 22. Upper wall 34a terminates at an angled rear wall 34b, from which a second portion of passage 38 extends vertically downward. An outer sleeve 34c extends downward from rear wall 34b and the lower portion of upper wall 34a. The inside surface of outer sleeve 34c is cylindrical. Lower housing 36 includes an inner sleeve 36a having an outside surface sized and shaped to slide into outer sleeve 34c. The vertically extending portion of passage 38 is cylindrical and is defined primarily by the interior conformation of inner sleeve 36a. Inner sleeve 36a terminates at an angled front wall 36a. Extending rearward from inner sleeve 36a and front wall 36b is a lower wall 36c that defines a third portion of passage 38 which extends horizontally from front wall 36b to exit opening 24. Thus, as will be appreciated, optical path 30 extends through housing 20 at the center of passage 38. Referring briefly to FIG. 4, upper housing 34 can be formed from two plastic housing members that are integrally joined along a line 39 once the optic elements are in place. This simplifies manufacturing of telemicroscope 10, since it obviates having to insert and locate the optic elements into upper housing 34 through entrance opening 22.

The optical system mounted within housing 20 includes an objective lens 40, a first surface mirror 42, a negative or divergent lens 44, an opaque screen 46, and a right angle prism 48. Objective lens 40 is a positive lens having an oblong shape. It is mounted within upper wall 34a of upper housing 34 at entrance opening 22. Preferably and as shown, objective lens 40 is an achromat. The principal axis of objective lens 40 is coincident with a first optical axis 30a of optical path 30. Mirror 42 is silvered on its front surface and is adhered to rear wall 34b of upper housing 34 at a forty-five degree angle with respect to optical axis 30a. Accordingly, mirror 42 reflects light traveling along optical axis 30a 14 downward by ninety degrees. The reflected light then travels along a second optical axis 30b of optical path 30 to divergent lens 44 which is mounted within inner sleeve 36a along optical axis 30b.

Prism 48 is mounted with its angled (hypotenuse) side located along a pair of side rails 36d (only one shown) that are located on either side of front wall 36a. Side rails 36d are used to space the angled side of prism 48 from front wall 36b to insure proper internal reflection of light within prism 48. Prism 48 is positioned on side rails 36d such that the angled side of prism 48 lies within a plane that is generally parallel to the plane containing the reflective surface of mirror 42. Protruding dimples (not shown) can be provided on opposing inside surfaces of lower wall 36c so that prism 48 can be inserted into lower housing 36 through exit opening 24 and held securely in place by the dimples, without the need for any adhesive.

Opaque screen 46 is located at the bottom of inner sleeve 36a between divergent lens 44 and one of the base sides of prism 48 to reduce and/or eliminate internal reflections from the surface of prism 48 back to divergent lens 44. Screen 46 includes an aperture 46a centered on optical axis 30b. Aperture 46a is defined by an angled surface inclined at thirty degrees with respect to optical axis 30b. This angulation of the aperture wall is selected to be greater than the maximum angle of the light along optical axis 30b to prevent reflections off the aperture wall that would otherwise been seen by the wearer. Preferably, aperture 46a has a diameter of approximately 2.8 mm, with screen 46 being formed as a unitary part of lower housing 36. Light reflected by prism 48 extends along a third optical axis 30c of optical path 30 and out through exit opening 24. Since the angled side of prism 48 is parallel to mirror 42, optical axis 30c is parallel to optical axis 30a. As will be appreciated, this optical system only requires two reflections of light traveling along optical path 30, resulting in a periscopic construction that involves a minimum amount of light loss.

Divergent lens 44 can be located at various places within inner sleeve 36a depending upon the level of magnification desired. For this purpose, inner sleeve 36a can include a ledge 36e to accommodate a larger diameter divergent lens. To minimize light loss through telemicroscope 10, a second mirror could be used in place of prism 48. However, prism 48 provides telemicroscope 10 with greater tolerance to alignment errors than it otherwise would have if a second mirror were used. Also, it will be understood that mirror 42 need only be oriented at approximately forty-five degrees with respect to optical axis 30a and that the angled side of prism 48 need only be generally parallel to mirror 42 since the relative orientations of prism 48 and mirror 42 need only be as accurate as required to provide an acceptable field of view through telemicroscope 10. The inside surface of lower wall 36c is generally cylindrical and can receive one or more additional optical elements press fit within lower wall 36c between prism 48 and exit opening 24. These additional optical elements can include a lens for providing astigmatic correction or a light filtering lens such as blue or kalichrome yellow to increase contrast. The following table provides preferred optical characteristics of objective lens 40 and divergent lens 44, with focal lengths being given in millimeters and resultant magnification indicating how may times the image is magnified.

| FOCAL LENGTH OF OBJECTIVE LENS 40 | FOCAL LENGTH OF DIVERGENT LENS 44 | RESULTANT MAGNIFICATION |
| --- | --- | --- |
| +31 | −15.0 | 2.07 × |
| +31 | −12.0 | 2.60 × |
| +31 | −10.0 | 3.10 × |
| +31 | −7.7 | 4.03 × |
| +31 | −6.0 | 5.16 × |
| +31 | −5.0 | 6.20 × |
| +35 | −5.5 | 6.36 × |
| +35 | −5.0 | 7.00 × |

With continued reference to FIGS. 1 and 2, clamp 26 will now be described. Clamp 26 comprises a clamping arm 50, a set screw 52, and a pair of flanges 54 that comprise an extension of a front surface 34d of upper housing 34. A rear perspective view of one of these flanges 54 is shown in FIG. 4. Referring now also to FIG. 1A, clamping arm 50 has a proximal end 50a and a distal end 50b. Proximal end 50a comprises a head portion 50c located within a passage 56 that extends into upper wall 34a from a front edge 34e of upper housing 34. Extending downward from head portion 50c is a neck 50d that terminates at a pair of shoulders 50e. Passage 56 has a cross-sectional shape that corresponds to head portion 50c and neck 50d extends from passage 56 through a slot 58 in upper wall 34a. Slot 58 extends from front edge 34e to a location proximate front surface 34d. It permits movement of clamping arm 50 toward and away from flanges 54. The width of slot 58 is smaller than the lateral extent of head portion 50c so that head portion 50c is retained within passage 56 and can only be removed through the opening in front edge 34e. The length of head portion 50c along passage 56 and the distance between head portion 50c and shoulders 50e are selected to prevent more than negligible rotation of head portion 50c within passage 56, thus restricting clamping arm 50 to translational movement. Distal end 50b of clamping arm 50 includes a rearward bend that terminates at a rear surface 50f which frictionally engages lens 16. The rearward bend provides clearance between the central portion of clamping arm 50 and both frame 14 and lens 16 so that the pressure exerted by clamping arm 50 on the spectacles 12 is at rear surface 50f.

Set screw 52 is held by threads within passage 56 and is used to hold proximal end 50a of clamping arm 50 within passage 56 and to provide the force required to clamp lens 16 tightly between clamping arm 50 and flanges 54. As set screw 52 is threaded further into passage 56, head portion 50c is force rearward, resulting in distal end 50b being moved toward flanges 54. As will be appreciated, telemicroscope 10 can be clamped tightly on spectacles 12 by threading set screw 52 into passage 56 until clamping arm 50 presses lens 16 tightly against flanges 54. Flanges 54 preferably include a rubber pad 60, adhesive tape, or other frictional surface to resist movement of telemicroscope 10 with respect to lens 16 once it has been clamped in place using set screw 52.

As will be appreciated from the foregoing description, much of telemicroscope 10 is located behind lens 16 of spectacles 12. This helps to minimize the cosmetic impact of telemicroscope 10, especially when a tinted lens is used or is placed over lens 16. Also, by using a line of sight located outside the periphery of lens 16, this construction obviates the need for boring a hole through lens 16 or for accounting for the diffraction provided by lens 16 when determining the desired optical characteristics of telemicroscope 10.

Also, clamp 26 provides an advantageous means for attaching telemicroscope 10 to spectacles 12 that overcomes several of the problems encountered with prior art bioptic telescopes. In particular, clamp 26 can be used to attach telemicroscope 10 to spectacles 12 without alteration of the spectacle lens or frame and the position of telemicroscope 10 on the spectacles 12 can be adjusted as desired. Thus, the telemicroscope can be mounted by the practitioner and fitting of the telemicroscope can therefore be accomplished on the initial office visit, even using the patient's existing spectacles. Since the position of the telemicroscope can be adjusted, the patient can wear the spectacles with the telemicroscope for a trial period. The particular process for fitting of the telemicroscope can be as follows. The telemicroscope is initially clamped loosely over the lens of the spectacles so as to hold the telemicroscope in place, but to allow lateral adjustment of the telemicroscope on the lens. Then the appropriate tests are performed to determine the proper location of the telemicroscope on the lens, with the position of telemicroscope being adjusted as needed. Once that location has been determined, clamp 26 is tightened to lock telemicroscope in place. If the spectacles include adjustable nose pads, then height adjustments can also be made during this process to achieve an optimal fit. The nose pads can also be used to alter the distance between the spectacles and the wearer's forehead as necessary to accommodate the telemicroscope. The patient can then evaluate the spectacles over a trial period and further adjustments to the location of the telemicroscope can easily be made if necessary. Also, if the telemicroscope does not prove to be suitable for a particular patient, then the telemicroscope can be easily removed from the spectacles.

Figure 3:
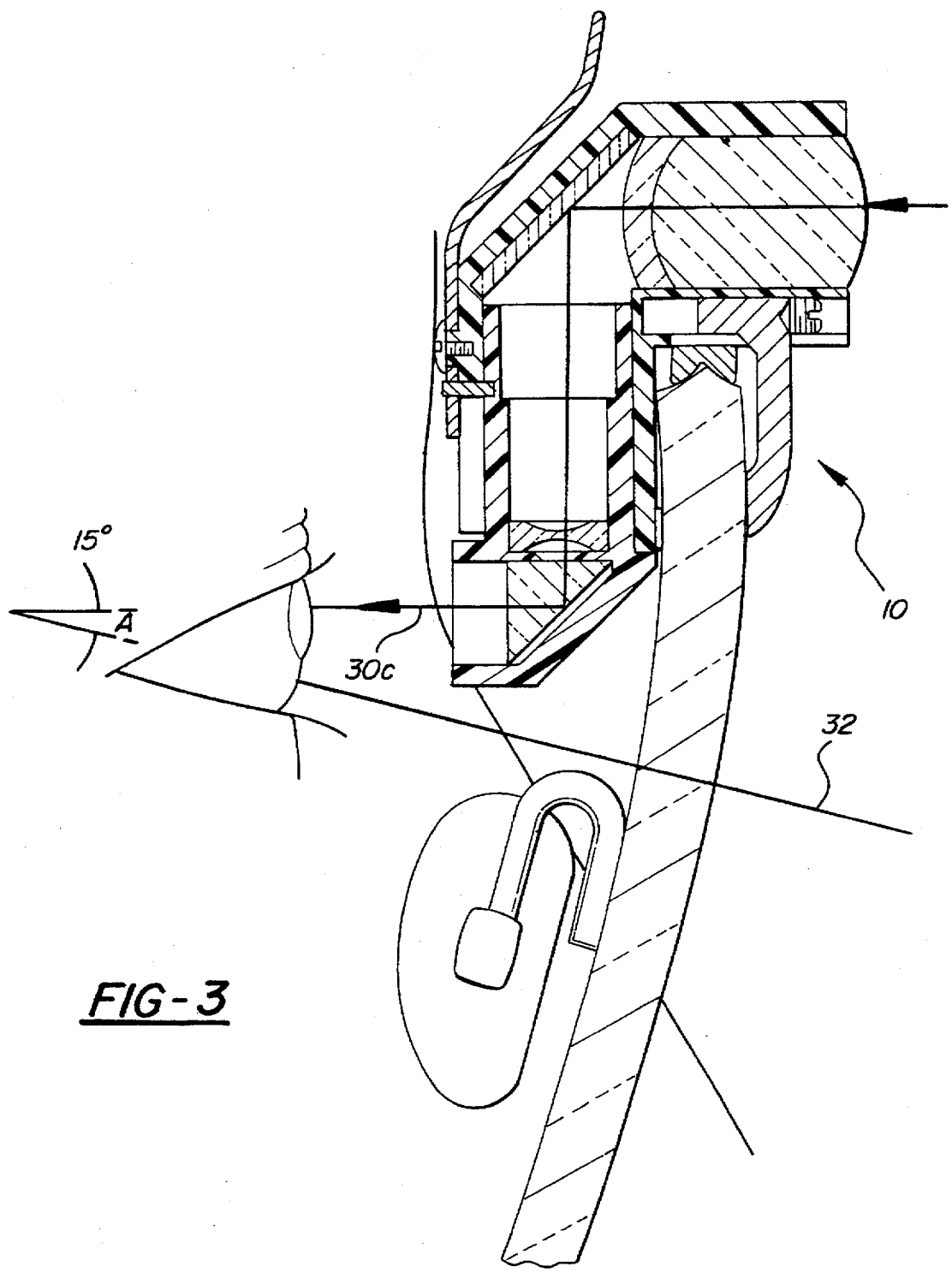
FIG. 3 is a sectional view as in FIG. 2, but showing the downward tilt of the wearer's head and the upward rotation of the wearer's eye used to view an image through the telemicroscope.

As indicated in FIG. 2, the angle A between optical axis 30c and the central axis 32 of spectacles 12 is approximately fifteen degrees. Angle A will of course vary for any particular implementation of telemicroscope 10, depending upon such factors as the size of lens 16 and the position of telemicroscope 10 with respect to that lens. To utilize telemicroscope 10 to view an object located along the wearer's normal viewing axis (i.e., central axis 32 in FIG. 2), all that is required is a downward head tilt and corresponding upwards eyeball rotation through an angle equal to that of the angle A (e.g., fifteen degrees). This position is shown in FIG. 3.

Referring now to FIGS. 2 and 4, focusing mechanism 28 will now be described. It comprises a lever 62, a guide pin 64, a self-tapping screw 66, and a support boss 68 which is a unitary, cylindrical extension of outer sleeve 34c of upper housing 34. Lever 62 includes a lever arm 62a and a base 62b. Base 62b includes a hole 62c therein which fits over boss 68 to permit pivotal movement of lever 62 about boss 68. Screw 66 threads into the center of boss 68 to retain lever 62 against upper housing 34. Boss 68 protrudes from the surface of upper housing 34 by a distance that is slightly greater than the thickness of lever 62 at hole 62c such that screw 66 seats against boss 68 and provides slight pressure against lever 62, but does not overly restrict lever 62 from pivoting. Guide pin 64 is rigidly connected to inner sleeve 36a of lower housing 36, preferably by press fitting pin 64 into a radial hole in inner sleeve 36a. It extends through a guide slot 70 in outer sleeve 34c and into a cam slot 62d formed in base 62b of lever 62. Guide slot 70 permits lower housing 36 along with guide pin 64 to move vertically toward and away from central axis 32, as can be seen in FIG. 2. Cam slot 62d is arcuate and eccentric with respect to boss 68 about which lever 62 pivots. Accordingly, when lever 62 pivots, the cam surface 62e that defines cam slot 62d bears against guide pin 64, forcing it to move along guide slot 70 and resulting in lower housing 36 moving vertically along a line that extends towards central axis 32.

Movement of lower housing 36 with respect to upper housing 34 changes the length along optical path 30 between objective lens 40 and divergent lens 44 and, thus, the focal length of telemicroscope 10. This enables the wearer to focus telemicroscope 10 between near and far distances using lever arm 62a. The figures show lower housing 36 in its fully retracted position for focusing at infinity, with FIG. 1 showing in broken lines the extended position of lower housing 36 used for focusing at close distances. As can be understood by reference to FIGS. 1 and 2, although lever arm 62a is substantially hidden from view behind upper housing 34, it is easily accessible to the wearer. This makes telemicroscope easily focusable, an advantage which is especially important for patients with nervous disorders or who suffer nerve damaging ailments, such as acute diabetes, which are often accompanied by low vision.

A second advantage of focusing mechanism 28 is that the adjustments in the length of optical path 30 between objective lens 40 and divergent lens 44 are done behind the lens and along a vertical line that extends toward central axis 32 (i.e., generally towards the center of lens 16). Since the direction of movement for focusing is not towards the eye, there is less risk of injurious contact with the eye and focusing can be accomplished over a greater range, at a greater magnification, and for a greater field of view than is provided by conventional telemicroscopes that are located behind the lens and that focus toward and away from the eye. Moreover, focusing in a direction toward the central axis of the spectacle lens permits much of the telemicroscope to be located behind the lens, thereby providing a cosmetic improvement over the telemicroscope disclosed in the above-noted patent to Pekar et al. which utilizes a casing mounted over the eyeglass frame and which focuses in a horizontal direction between the wearer's eyebrows.

Of course, telemicroscope 10 need not be mounted over the top portion of the spectacle lens, but rather could be attached over a side or bottom portion of the spectacle lens. In any event, focusing would be generally along the plane of the spectacle lens (i.e., towards the central axis of the spectacle lens).

It will thus be apparent that there has been provided in accordance with the present invention a periscopic telemicroscope which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the spirit and scope of the appended claims.

What is claimed is:

1. A periscopic telemicroscope for attachment over a portion of the periphery of a lens of a pair of eyeglasses to provide increased visual acuity along an optical axis located beyond the periphery of the lens of the eyeglasses, comprising:

a housing having a first opening and a second opening said housing being adapted to attach over a portion of the periphery of a lens of a pair of eyeglasses such that said first opening is located outside the periphery of the lens of the pair of eyeglasses, whereby light entering said first opening does not pass through the lens of the pair of eyeglasses;

a plurality of optically reflective elements mounted within said housing and defining an optical path extending from said first opening to said second opening;

a convergent lens mounted within said housing and being disposed in said optical path;

a divergent lens mounted in said housing and being disposed in said optical path said divergent lens being movable along said optical path relative to said convergent lens to thereby the focal length of the periscopic telemicroscope;

wherein said housing comprises an upper housing and a lower housing with said upper housing containing said first opening, said convergent lens, and a first one of said optically reflective elements, and said lower housing containing said second opening, said divergent lens, and a second one of said optically reflective elements; and wherein said lower housing is movable with respect to said upper housing along a portion of said optical path that extends from said upper housing to said lower housing.

2. A periscopic telemicroscope as defined in claim 1, wherein said optical path extends along first, second, and third optical axes, with said first optical axis extending from said first opening to said first optically reflective element, said second optical axis extending from said first optically reflective element through said divergent lens to said second optically reflective element, and said third optical axis extending from said second optically reflective element to said second opening, wherein said first optically reflective element has a first planar reflective surface oriented at approximately forty-five degrees with respect to said first and second optical axes, and said second optically reflective element has a second planar reflective surface oriented generally parallel to said first planar reflective surface, whereby said first optical axis is generally parallel to said third optical axis.

3. A periscopic telemicroscope as defined in claim 2, wherein said second optically reflective element comprises a right angle prism and wherein the periscopic telemicroscope further comprises an optically opaque member disposed between said divergent lens and said prism, said opaque member having an aperture centered on said optical path.

4. A periscopic telemicroscope as defined in claim 1, further comprising:

a guide pin connected to said lower housing and extending outwardly from said lower housing;

a lever having a base pivotally mounted to said upper housing and a lever arm extending away from said base, said base including a cam slot;

wherein said lower housing includes a first tubular sleeve and said upper housing includes a second tubular sleeve that slidably fits over said first sleeve;

wherein said upper housing has a guide slot extending parallel to said portion of said optical path, with said guide pin extending from said first sleeve through said guide slot and into said cam slot, whereby pivoting of said lever arm moves said cam slot relative to said guide pin, causing said guide pin to move along said guide slot and resulting in relative movement between said upper and lower housings, whereby pivoting of said lever arm changes said focal length.

5. A periscopic telemicroscope as defined in claim 4, wherein said lever pivots about a pivot axis and said cam slot is arcuate and eccentric with respect to said pivot axis.

6. A periscopic bioptic telescope for attachment over a portion of the periphery of a lens of a pair of eyeglasses to provide increased visual acuity along an optical axis located beyond the periphery of the lens of the eyeglasses, comprising:

a housing having a first opening located along a first optical axis and a second opening located along a second optical axis that is different than said first optical axis;

a plurality of optically reflective elements mounted within said housing and defining an optical path extending from said first opening to said second opening;

a convergent lens mounted within said housing and being disposed in said optical path;

a divergent lens mounted in said housing and being disposed in said optical path;

a clamp attached to said housing and offset from said first opening such that, when said housing is attached over a portion of the periphery of a lens of a pair of eyeglasses by said clamp, said first opening is located beyond the periphery of the lens and said second opening is located behind the lens with said second optical axis intersecting the lens, wherein light passing through the telescope is received by a wearer of the eyeglasses along the second optical axis without passing through the lens.

7. A bioptic telescope as defined in claim 6, wherein said clamp comprises a first clamping surface on said housing and a clamping member having a proximal end, a distal end, and a second clamping surface at said distal end, said clamping member being coupled to said housing at said proximal end with said distal end being positionable with respect to said first clamping surface, whereby said housing can be releasably attached to a lens of a pair of eyeglasses by frictional engagement of said first and second clamping surfaces when said distal end is positioned to press the lens against the first clamping surface.

8. A bioptic telescope as defined in claim 7, wherein said housing includes a passage that is threaded along at least a portion of said passage and that extends into said housing from a third opening in said housing, said passage having a slot extending lengthwise along the passage;

wherein said proximal end extends into said passage through said slot and terminates in a head portion of said clamping member that is located within said passage;

wherein said clamp further comprises a screw in said passage between said third opening and said head portion of said clamping member.

9. A bioptic telescope as defined in claim 7, wherein said first clamping surface comprises an adhesive surface.

10. A bioptic telescope as defined in claim 6, wherein said divergent lens is movable with respect to said convergent lens to thereby vary the distance along said optical path between said convergent and divergent lenses and wherein the bioptic telescope further comprises a lever pivotally mounted on said housing and coupled to said divergent lens to adjust the position of said divergent lens with respect to said convergent lens.

11. A bioptic telescope as defined in claim 10, wherein said housing comprises an upper housing and a lower housing, said convergent lens and lever being mounted to said upper housing and said divergent lens being mounted in said lower housing, wherein said lever is coupled to said lower housing to move said lower housing with respect to said upper housing.

12. A bioptic telescope as defined in claim 11, further comprising:

a guide pin connected to said lower housing and extending outwardly from said lower housing;

wherein said lever has a base pivotally mounted to said upper housing and a lever arm extending away from said base, said base including a cam slot;

wherein said lower housing includes a first tubular sleeve and said upper housing includes a second tubular sleeve that slidably fits over said first sleeve;

wherein said upper housing has a guide slot with said guide pin extending from said first sleeve through said guide slot and into said cam slot, whereby pivoting of said lever arm moves said cam slot relative to said guide pin, causing said guide pin to move along said guide slot and resulting in relative movement between said upper and lower housings, whereby pivoting of said lever arm changes the distance along said optical path between said convergent and divergent lenses.

13. A periscopic telemicroscope for attachment over a portion of the periphery of a lens of a pair of eyeglasses to provide increased visual acuity along an optical axis located beyond the periphery of the lens of the eyeglasses, comprising:

a housing having a first opening and a second opening, said housing being adapted to attach over a portion of the periphery of a lens of a pair of eyeglasses such that light enters said first opening along a first optical axis that is located outside the periphery of the lens and exits behind the lens through said second opening along a second optical axis that is located within the periphery of the lens, whereby light entering said first opening does not pass through the lens of the pair of eyeglasses;

a plurality of optically reflective elements mounted within said housing and defining an optical path extending from said first opening to said second opening; a first lens mounted within said housing and being disposed in said optical path;

a second lens mounted in said housing and being disposed in said optical path, said second lens being movable along said optical path relative to said first lens to thereby vary the focal length of the periscopic telemicroscope.

14. A periscopic telemicroscope as defined in claim 13, wherein said convergent lens is mounted in said housing at said first opening, a first one of said optically reflective elements is located along said optical path between said convergent and divergent lenses, said divergent lens is located along said optical path between said first optically reflective element and a second one of said optically reflective elements, and said second optically reflective element is located along said optical path between said divergent lens and said second opening.

15. A periscopic telemicroscope as defined in claim 13, further comprising a clamp at said housing for releasably securing said housing to a lens of a pair of eyeglasses.

16. A periscopic telemicroscope as defined in claim 15, wherein said clamp comprises a first clamping surface on said housing and a clamping member having a proximal end, a distal end, and a second clamping surface at said distal end, said clamping member being coupled to said housing at said proximal end with said distal end being positionable with respect to said first clamping surface, whereby said housing can be releasably attached to a lens of a pair of eyeglasses by frictional engagement of the lens with said first and second clamping surfaces when said distal end is positioned to press the lens against the first clamping surface.

17. A periscopic telemicroscope as defined in claim 16, wherein said housing includes a passage that is threaded along at least a portion of said passage and that extends into said housing from a third opening in said housing, said passage having a slot extending lengthwise along the passage;

wherein said proximal end extends into said passage through said slot and terminates in a head portion of said clamping member that is located within said passage;

wherein said clamp further comprises a screw in said passage between said third opening and said head portion of said clamping member.

\* \* \* \* \*

UNITED STATES PATENT AND TRADEMARK OFFICE
CERTIFICATE OF CORRECTION

PATENT NO.      :   5,680,194

DATED           :   October 21, 1997

INVENTOR(S)     :   Michael T. Pasfield

It is certified that errors appear in the above-identified patent and that said Letters Paten is hereby corrected as shown below:

Abstract, lines 18 and 19, delete "potation" and insert therefor --portion--. Abstract, line 23, afte "against" insert --the--.  Column 5, line 66, after "wall" delete "36a" and insert therefor --36b-- Column 6, line 29, delete "36a" and insert therefor --36b--. Column 10, line 24, after "thereby insert --vary--.

Signed and Sealed this

Twenty-eighth Day of July, 1998

*Attest:*

BRUCE LEHMAN

*Attesting Officer*     *Commissioner of Patents and Trademarks*